United States Patent Office 2,979,778
Patented Apr. 18, 1961

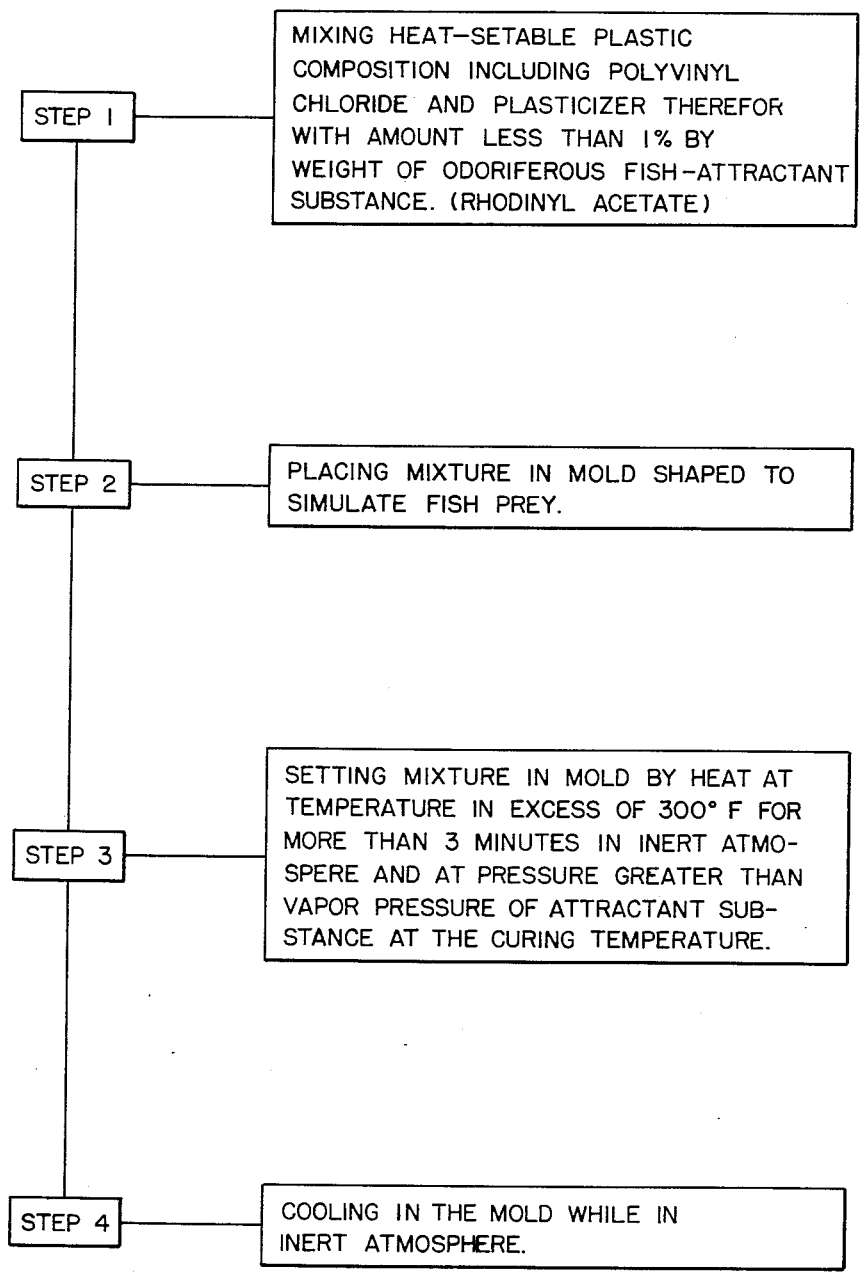

2,979,778

METHOD OF MAKING A FISHING LURE

Ogden FitzSimons, Chester Springs Road, Kimberton, Pa., assignor of seventy-five percent to Drift-A-Lure, Inc., Rochester, N.Y., a corporation of New York Filed Sept. 27, 1956, Ser. No. 612,564

3 Claims. (Cl. 18—58)

This invention relates to a method of making an artificial fishing lure.

It is well known that fish have an acute sense of smell and are responsive to the odor of materials. Substances that are capable of attracting fish by their odor are termed attractants.

A large number of substances have been used in the past for treating fish bait. Most of these substances are oily or oleaginous by nature, and many are essential oils or tinctures, or aromatic organic compounds such as esters and alcohols. Some typical suitable materials include, for example, oil of patchouli, oil of cumin, tincture of asafetida, tincture of musk, oil of celery, oil of fennel, oil of anise, rhodinol, oil of peppermint, oil of pennyroyal, poultry fat, meat fat, and similar materials. In fact, suet and bacon fat are frequently used as bait.

The liquid materials named above have most frequently been employed to treat the surface of a natural bait. However, after a short period of immersion, the water removes the attractant from the treated material so that the attractant is no longer effective. Moreover, while an attractant may draw a fish to the bait, if the bait is artificial, a tentative nibble by the fish may discourage it. This is particularly true where the artificial bait is wooden or metallic, and where the attractant concentration is very low.

An object of the present invention is to provide a method for making an artificial lure having an odor and texture that duplicates, as nearly as possible, the odor and texture or taste of natural bait.

Another object of the invention is to provide a method for making an artificial lure having incorporated therein a fish-attractant material that remains active over a long period of time.

Another object of the invention is to provide a method for making an artificial fishing lure that has incorporated therein an attractant for fish that is progressively released from the surface of the lure over a long period of time.

Still another object of the invention is to provide a method for making an artificial fishing lure having a plastic body in which a fish hook is imbedded and which contains an odoriferous fish attractant that retains its potency during the useful life of the lure.

An artificial fishing lure made according to one embodiment of this invention, consists of a plastic body that is shaped and colored to simulate a natural fish prey, that has imbedded therein a fish hook, and that has uniformly distributed therein a relatively small amount (less than about 1% by weight) of a fish attractant that can migrate in the plastic for progressive release at the surface thereof over the useful life of the lure. In a preferred embodiment of the invention, the plastic body is made of plasticized polyvinyl chloride, suitably stabilized, filled, and colored, and containing in substantially uniform distribution therein about 0.1% by weight thereof, or less, of rhodinyl acetate.

To make the preferred embodiment of the invention just described, a polyvinyl chloride plastisol containing about one part of finely ground resin for each one to three parts of plasticizer is stabilized, filled, and pigmented, and 0.1% or less by weight of the rhodinyl acetate is stirred into the plastisol. The mixture is then placed in a mold, and is cured at a temperature in the range of about 300° F. to about 400° F. for a few minutes, during which time the plastic is maintained under an inert atmosphere at a pressure well above the vapor pressure of the rhodinyl acetate at that temperature. The inert atmosphere prevents oxidation of the rhodinyl acetate, while the use of superatmospheric pressure retards its volatilization. Preferably, the molded body is retained in the mold under the inert atmosphere and/or at superatmospheric pressure, until both the mold and the molded plastic body have cooled to room temperature. This also retards volatilization.

In the drawing, the figure is a flow diagram illustrating the various steps in the process of making a fishing lure according to one embodiment of this invention.

The invention may be best understood by a detailed description of several embodiments thereof, as follows:

*Example 1*

A plastisol was formed by mixing together one part of a finely ground polyvinyl chloride resin with three parts of dioctyl phthalate. The resin employed was a commercially available resin sold under the trademark, "Exon 654," by the Firestone Plastics Company. A very small amount of chrome yellow pigment was mixed into the plastisol thus formed. Slightly less than 0.1% by weight of rhodinyl acetate was mixed into the plastisol.

The mixture was then poured into a suitable mold, containing a hook in proper position, to form a dragon fly nymph, and was cured in an oven at 350° F. for fifteen minutes. During the curing period, an atmosphere of nitrogen was maintained in the oven at a pressure of more than 50 p.s.i. After the cure was complete, the bait body was stripped from the mold.

In this example, the hook was positioned in the mold before the mold was filled with the plastisol mixture. The body of the lure was thus secured around the hook by molding the hook in situ. However, this is an optional technique, and it is possible to mount the molded plastic body on a hook after curing.

The lure proved unusually effective when compared with a similar dragon fly nymph lure which did not have incorporated therein any rhodinyl acetate. The added attraction of the artificial bait prepared according to this example was not diminished even after a very extended period of immersion in water. At least part of the success of the bait appears to be attributable to the fact that fish are not discouraged by one nibble, but return in an effort to consume the entire bait. This is probably attributable to the fact that the texture of the plastic body simulates the taste of the nymph, while the attractant simulates its odor.

*Example 2*

Another artificial bait was prepared by a process similar to that described in Example 1. One part of finely divided polyvinyl chloride was admixed with two parts of dioctyl phthalate and a small amount of chrome yellow pigment. Somewhat less than 0.1% by weight of the plastisol of rhodinyl acetate was then mixed therein. The mixture was poured in a crane fly nymph mold and was cured in an oven at a temperature of 340° F. for ten minutes. During the curing period, an atmosphere of carbon dioxide at atmospheric pressure was maintained in the oven.

After the curing was completed, the plastic body was allowed to cool to room temperature in the mold, in the inert atmosphere, and was then removed from the mold.

It was tested for attractiveness to fish, and the attractant was sufficiently powerful that this lure actively attracted fish when, at the same time and in the same location, under the same conditions, a lure not containing the attractant but identical in all other respects aroused no interest.

The foregoing specific examples are illustrative only, and various modifications may be made within the spirit of the invention from the specific disclosures of the two examples. Thus, other synthetic resinous materials may be substituted for the polyvinyl chloride-acetate copolymer, "Exon 654" used in each of the two examples, that is commonly referred to as a polyvinyl chloride resin. Polyvinyl chloride plastisols are preferred, however, since they are easily obtained and may be handled by conventional techniques, and cure to a desired texture. Polyethylene is an example of another suitable molding resin.

The plasticizer may be dioctyl phthalate as in the examples, or any other suitable plasticizer, such as, for example, dibutyl phthalate, diethylhexyl adipate, acetyl tributyl citrate, tricresyl phosphate, dioctyl azelate, and the like. Usually, best results are obtained when one to three parts of the plasticizer are employed for one part of the resin.

Rhodinyl acetate is the preferred attractant, and it is effective in amounts less than 0.1% of the plastic body by weight, preferably 0.01% to 0.1%. However, other attractants may be used, but proportions exceeding 1% by weight of the plastic are seldom needed.

Most of the essential oils which act as fish attractants can be mixed directly into the plastic mixture before curing. Then, the plastic after curing will retain, incorporated therein, the attractant which will release its odor over a very long period of time. Apparently, as the attractant is washed off the surface of the lure, the attractant gradually migrates outwardly through the plastic material to the surface of the lure, from which it diffuses into the water and attracts the fish. While a wide variety of attractant materials are available, it is desirable that the oil or other attractant be miscible in the plasticizer. Since a large number of plasticizers are available, the selection of a plasticizer that is miscible with any particular attractant presents no problem.

Many of the attractant substances are oils which are of a highly volatile, easily oxidizable nature, and so are lost when cured in an ordinary oven. Such losses can be eliminated or minimized by curing the plastic mixture in a pressurized atmosphere in which the pressure is maintained above the vapor pressure of the attractant at the particular curing temperature being used. This technique minimizes the amount of attractant material that is vaporized and lost. While it is possible to pressurize the oven's air, it is preferred that an inert atmosphere be used. Carbon dioxide, nitrogen, argon, helium, and other inert gases or mixtures of inert gases may be employed. The use of these inert gases prevents oxidation of the attractant and adds to the safety of the operation. Best results are obtained in preservation of the attractant when the cured plastic body is permitted to cool in the mold to room temperature before the mold and plastic body are removed from the inert or pressurized atmosphere. Conventional curing times and temperatures are used. Thus, with polyvinyl chloride plastisols, curing at 300° F. to 400° F. for about three to about thirty minutes, is customary.

The artificial baits prepared according to this invention are most attractive when the plastic is cast or molded into shapes that resemble the natural food for the particular game fish in question. Bait shapes resembling the dragon fly nymph, crane fly nymph, pollywog, hellgrammite, stone cat fish, minnow, and the like, are particularly effective. The coloration as well as the appearance of the natural fish prey should be copied as closely as possible for best results.

By proper selection of the synthetic plastic, the plasticizer and its proportions, and the attractant, the odor and taste of each natural fish prey named above can be simulated very closely.

While the invention has been described in connection with specific embodiments thereof, then, it will be understood that it is capable of further modification, and this application is intended to cover any variations, uses, or adaptations of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. The method of making a fishing lure which comprises providing a heat-settable plastic composition including at least a synthetic resin and a plasticizer therefor, mixing with said composition an amount less than 1% by weight of an odoriferous fish-attractant substance to distribute said substance thoroughly throughout the mixture, placing said mixture in a mold shaped to simulate a natural fish prey, and setting said mixture in the mold by heat in an inert atmosphere and at a pressure greater than the vapor pressure of the attractant substance at the curing temperature to prevent volatilization of the fish-attractant substance during curing, thereby to produce a fishing lure having an odor and texture simulating natural fish prey.

2. The method of making a fishing lure as claimed in claim 1 in which the plastic composition is a polyvinyl cloride plastisol, and the odoriferous fish-attractant substance is rhodinyl acetate.

3. The method of making a fishing lure as claimed in claim 1 wherein the mixture is set in the mold at a temperature in excess of 300° F. for a setting period in excess of three minutes, and the set plastic body is cooled in the mold while in the inert atmosphere.

References Cited in the file of this patent

UNITED STATES PATENTS

| | | |
|---|---|---|
| 1,659,132 | Coffman | Feb. 14, 1928 |
| 1,922,841 | Cooley | Aug. 15, 1933 |
| 2,129,245 | Stenstrom | Sept. 6, 1938 |
| 2,188,396 | Semon | Jan. 30, 1940 |
| 2,269,037 | Oker | Jan. 6, 1942 |
| 2,742,731 | Lovelace | Apr. 24, 1956 |

OTHER REFERENCES

Baird: P.V.C. Paste, "British Plastics," April 1948, pages 167–171.